April 16, 1968   J. D. MITCHELL ET AL   3,378,065
BLOWER ARRANGEMENT FOR PEANUT DRYER
Filed Aug. 19, 1965   3 Sheets-Sheet 2

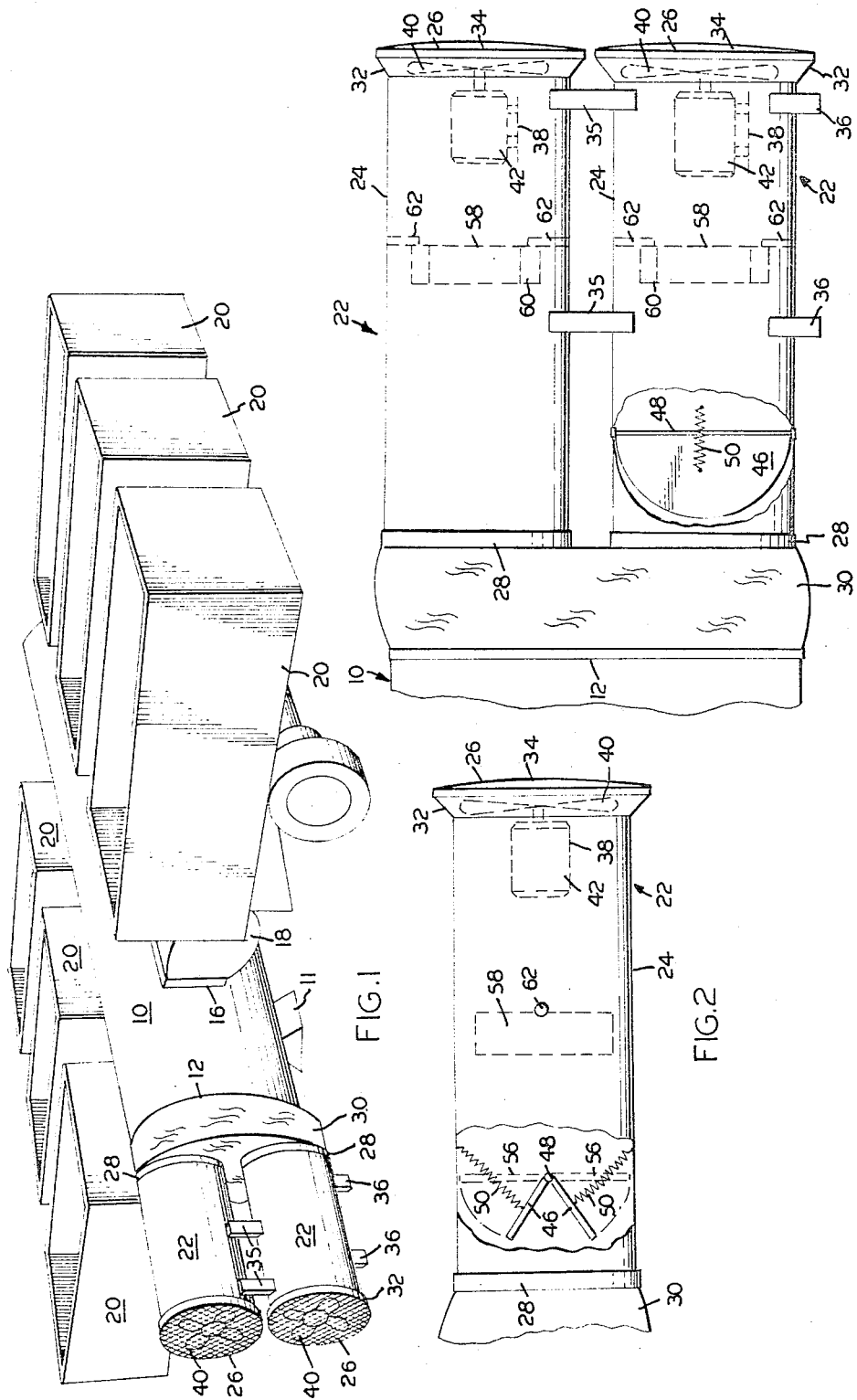

United States Patent Office 3,378,065
Patented Apr. 16, 1968

3,378,065
BLOWER ARRANGEMENT FOR PEANUT DRYER
John D. Mitchell and William R. Hall, Woodville, N.C., assignors to Harrington Manufacturing Company, Lewiston, N.C., a corporation of North Carolina
Filed Aug. 19, 1965, Ser. No. 481,142
3 Claims. (Cl. 165—122)

ABSTRACT OF THE DISCLOSURE

This invention relates to a drying system for peanuts and like comprising in combination, a plenum chamber, a plenum inlet and a plenum outlet and at least two air blower means located in the plenum inlet that are provided with air flow check means so as to prevent the backward flow of air through any air blower means.

---

This invention relates to a drying system for articles to be dried which are stored in bulk form, and more particularly, to a drying system which can be easily used in a rural area where three phase power is not readily available.

Crops such as corn and peanuts when stored immediately after gathering from the field will spoil if the moisture content of the crop is too high and especially if the weather is humid at the time of harvesting. Therefore, it is desirable to provide a method for drying the crop in a relatively short time to prevent spoilage and to place the crop in a condiiton for further storage.

Co-pending application Ser. No. 481,127 filed Aug. 19, 1965, describes a transportable dryer system which may be used for drying peanuts and the like crops. The basic drying system which is used in that co-pending application may also be used in conjunction with the invention of the present application.

One of the main problems experienced in drying systems such as that disclosed in the co-pending application Ser. No. 481,127 is that in certain rural areas three-phase power is not readily available. Therefore, in such areas it is necessary to use single-phase power as it is all that is available. In the system described in the co-pending application Ser. No. 481,127 use is made of a plenum chamber which may be operated from the ground or may be operated from the bed of a trailer as it is completely transportable. In conjunction with the plenum chamber, mobile trailers or drying bins are provided which may be connected to outlets in the plenum chamber via canvas ducts. One end of the plenum chamber is provided with an inlet through which heated or inheated air may be forced in order to dry the peanuts or like crops which are contained in the mobile trailers or bins. The air which passes through the plenum chamber is ordinarily provided by a blower means which includes a fan and motor for driving the fan (and sometimes a heating means) so that when the fan is in operation it can force air into the plenum chamber through the inlet thereof.

If three-phase power is available a single large fan may be used for forcing the air into the plenum chamber. However, a large fan usually requires at least a ten horsepower motor. However, in certain rural areas where three-phase power is not readily available, single-phase power must be resorted to. In such a situation, single-phase power is not practical for a ten-horsepower motor and therefore it is necessary to resort to employing two or more air blower means disposed in side-by-side relationship with their axes generally parallel to each other and to the ground, each being driven by a smaller motor (such as a five-horsepower motor) which can operate effectively on single-phase current.

However, in employing a plurality of air blower means problems are presented. For example, it is usually desirable to cut down the amount of air being sent into the plenum chamber as the drying of the crop nears completion (and consequently does not require as great a volume of air). Therefore, one of the fans located in one of the air blower means may be stopped and the system will continue to operate with a fewer number of fans. When this is done, however, there is a back-pressure created in the plenum chamber which causes air to escape from the plenum chamber out though the outlet end to the inlet end of the air blower means whose associated fan has been stopped.

It is therefore a primary object of the present invention to provide a means for overcoming the problem created by back-pressure when one of the fans in an air blower means is cut off. A further object of this invention is to provide means for allowing the air created by a fan to pass freely into the plenum chamber and to prevent the escape of air from the main plenum chamber when such a fan is stopped. Still another object of the present invention is to provide a dryer blowing arrangement which operates more efficiently. Another object of the present invention is to provide a dryer blowing system in which the volume of forced air can easily be increased or decreased without changing the efficiency of the system. Finally, another object of the present invention is to provide a dryer blowing system which prevents the escape of air from the plenum chamber when the blowing system or a portion thereof is stopped.

Other objects and advantages of the dryer blowing system will become apparent to one skilled in the art, from the following description when read in conjunction with the accompanying drawings, wherein:

FIGURE 1 is a perspective view of a plenum chamber having a plurality of air blower means and a plurality of mobile drying bins or trailers hooked up to the plenum chamber for operation;

FIGURE 2 is a partially cutaway and fragmentary top view of the blower means of the present invention;

FIGURE 3 is a partially cutaway and fragmentary side view of a plurality of blower means like the blower means shown in FIGURE 2;

Figure 4:
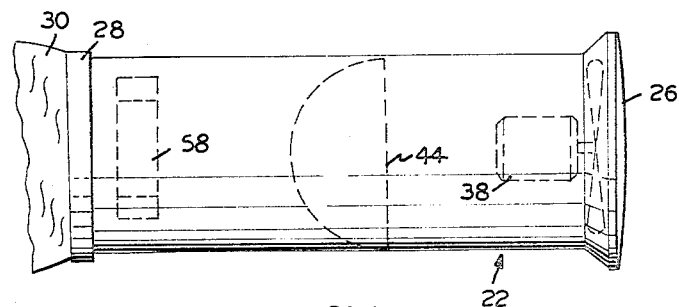
FIGURES 4–8 are fragmentary side views of alternative embodiments of the blower means shown in FIGURE 2.

Considered from one aspect the present invention involves a drying system for peanuts and the like comprising in combination:

(a) A plenum chamber,
(b) A plenum inlet to said plenum chamber for the introduction of heated or unheated air,
(c) At least two plenum outlets for air located at spaced intervals along the length of said plenum chamber, said plenum outlets being adapted to conduct air to one or more drying bins located outside the plenum chamber,
(d) The said plenum inlet being connected to a source of air,
(e) Said source of air comprising:
(1) at least two air blower means,
(A) each air blower means having a generally tubular configuration and each having an inlet end and an outlet end,
(B) said air blower means being mounted side-by-side with their axes generally parallel to each other and to the ground, (C) the outlet end of each air blower means being connected to said plenum inlet, and (2) an air flow check means associated with at least one of said air blower means for preventing the flow of air from the outlet end to the inlet end of said air blower means.

It is believed that the invention will now be understood in specific terms by referring to the figures.

FIGURE 1 shows generally a plenum chamber 10 which has a long cylindrical shape lying substantially parallel to the ground but spaced therefrom. The plenum chamber 10 rests above the ground on supports 11 (only one of which is shown in FIGURE 1).

At one end of the plenum chamber 10 there is a plenum inlet 12 through which heated or unheated air is introduced into the chamber 10. The end of the chamber 10 opposite the inlet 12 is closed.

Along the length of the plenum chamber 10 at spaced intervals, there are located a plurality of outlets 16 (only one of which can be seen in FIGURE 1). Connected to each of the outlets 16 is a canvas duct 18 which leads from the outlet 16 to a mobile drying bin 20. A mobile drying bin 20 may be provided at each of the outlets 16 and may be supplied with air which passes through the outlet 16, and through the canvas duct 18 into the bin 20 to dry the crop contained therein.

The plenum inlet 12 is connected to a source of heated or unheated air. The air passes into the plenum chamber 10 through the inlet 12 and travels down the chamber 10. The air then passes out of the chamber 10 via the outlets 16, through the canvas ducts 18 and into the respective drying bins 20, to dry the crop contained in the bins.

FIGURES 1–3 show a source of air comprising two heated-air blower means 22 connected to the inlet 12 of the plenum chamber 10. These air blower means 22 may consist of any means for forcing air into the plenum chamber 10. FIGURES 1 and 3 show that the air blower means may be stacked one on top of another but they could be stacked in a horizontal relationship to one another. The air blower means are preferably not aligned at an angle with respect to each other because of the possibility that some of the total force of the air stream would thus be lost.

Each of the air blower means 22 is of generally tubular configuration and has an outer housing 24 which may be made of a thin sheet metal. The present embodiment is of cylindrical shape but the housing 24 could be made in other shapes, for example it could have a square or rectangular cross section.

Each of the housings 24 has an inlet end 26 and an outlet end 28. The outlet end 28 of the housing 24 is connected to the plenum inlet 12 by means of a canvas duct 30. Each inlet end 26 has a slight frusto-conical portion 32 which flares outwardly away from the housing 24. Secured over the inlet end 26 of the housing 24 is a protective wire mesh screen 34 which prevents any undesired objects from entering the inlet end 26 of the housing 24.

All of the blower means 22 as shown in FIGURES 1 and 3 are preferably mounted in a side-by-side relationship with their axes generally parallel to each other and to the ground and as illustrated are placed one on top of another. However, blower means 22 could be mounted in side-by-side relation with one another (i.e. all lying in a horizontal plane) instead of being stacked one on top of another. Such an arrangement would merely be a matter of choice. Side-by-side arrangements are preferred because of efficiency, although it is conceivable that other arrangements might be used.

The lower blower means 22 may be positioned above the ground by means of members 36. On the upper surface of the housing 24 of the lower blower means 22 are another pair of supports 35 for attaching and supporting the upper blower means 22. A similar arrangement could be provided for any other blower means which may be provided above the upper blower means 22. Additional blower means could be mounted above the upper blower means 22 if desired providing the plenum chamber 10 were large enough to accommodate additional blower means.

All of the outlet ends 28 of the blower means 22 are connected to the air inlet end 12 of the plenum chamber 10 by means of a canvas duct 30. If desired, the canvas duct 30 could be eliminated and a direct connection could be made. However, the preferable form of the invention includes the canvas duct 30 connecting the outlet ends 28 of the blower means 22 to the inlet 12 of the main plenum chamber 10 because the added distance from the blower means 22 to the inlet 12 of the plenum chamber 10 provides greater equalization of air to all the outlets 16 of the chamber 10.

Each of the blower means 22 has an air flow producing means 38 mounted therein. In the preferred embodiment the air flow producing means 38 is a fan having blades 40 and a motor 42. (It is possible that a small jet engine could be used as the air flow producing means instead of the fan.) In the preferred embodiment as shown in FIGURES 2 and 3, the air flow producing means 38 is located adjacent the inlet end 26 of the blower means 22. However, as will be seen later, the air flow producing means 38 may be located at other positions within the blower means 22.

There may also be located within the blower means 22 between the air flow producing means 38 and the outlet end 28 thereof a heating means 58 which in the embodiment of FIGURE 3 is shown in dotted form to be the heating ring 60. However, the heating means may be any conventional type of heater for generating warm air. heating ring 60. However, the heating means may be blower means 22 by means of securing members 62. While the preferred embodiment of the present invention includes the heating means 58 in each of the blower means 22, it is not absolutely necessary that a heating means be provided in the blower means 22. However, the drying process is much more efficient and rapid when the blower means 22 are provided with some type of heating apparatus so that warm air rather than merely the prevailing outside-temperature air may be sent through the plenum chamber 10. Heating means are not necessary and can be omitted if desired.

At the outlet end 28 of the blower means 22 is located an air flow check means which in the preferred embodiment includes a pair of doors 46 which have flat semi-circular shapes and may be made of wood, metal, or plastic materials. These doors 46 are mounted adjacent the outlet end 28 of the blower means 22 by means of a hinged pivot 48. Also included in the air flow check means are springs 50 each of which has one end connected to the doors 46 and having the other end connected to the interior of the housing 24 of the blower means 22. Doors 46 are shown in open position whereby the air may flow through the outlet end 28 of the blower means 22 and into the plenum chamber 10 when the air flow producing means 38 is in operation. When the air flow producing means 38 of the lower blower means 22 is stopped the doors 46 will move to the dotted position 56 illustrated in FIGURE 2. In this position the doors 46 effectively close the outlet end 28 of the lower blower means 22 thereby preventing any flow of air in either direction through the lower blower means 22. When the doors 46 are in the dotted positions shown as 56 the springs 50 will be in a condition of minimum stretch or tension. Substantial tension is placed on the springs 50 only when the lower air flow producing means 38 is in operation since the force of air against doors 46 causes the doors to move toward each other.

In each of the FIGURES 4 through 8 there is shown different positional relationships between the air flow producing means 38, the heating means 58 and the air flow check means (generally designated as 44). In all these figures the inlet ends 26 of the blower means 22 appear on the right-hand side and the outlet ends 28 appear on the left-hand side.

More specifically, in FIGURE 4, the air flow producing means 38 is located adjacent the inlet end 26 while the air flow check means 44 is located between the air flow producing means 38 and the outlet end 28. The heating means 58 is located between the air flow check means 44 and the outlet end 28.

Figure 5:
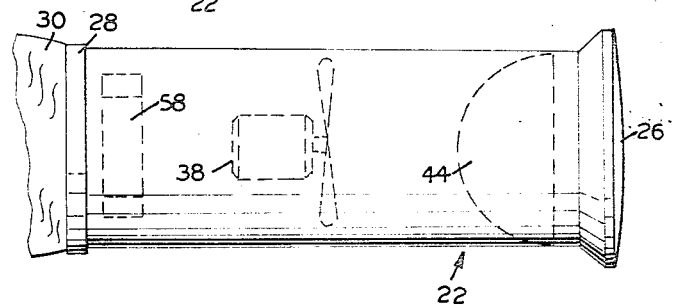

In FIGURE 5 the air flow check means 44 is located near the inlet end 26 of the blower means 22, the air flow producing means 38 is located between the air flow check means 44 and the outlet end 28 of the blower means 22, and the heating means 58 is located between the air flow producing means 38 and the outlet end 28 of the blower means 22.

Figure 6:
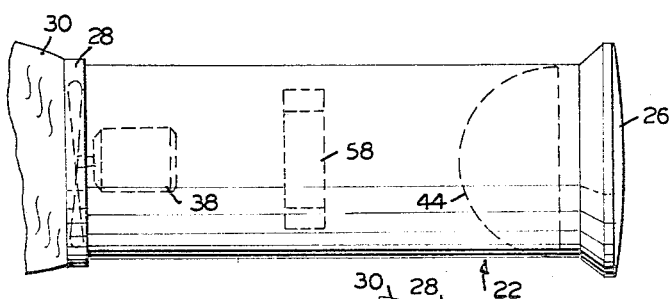

FIGURE 6 shows the relationship where the air flow check means 44 is located near the inlet end 26 of the blower means 22, the heating means 58 is located in the blower means 22 between the air flow check means 44 and the outlet end 28 of the blower means 22, and the air flow producing means 38 is located in the blower means 22 between the heating means 58 and the outlet end 28 of the blower means 22.

Figure 7:
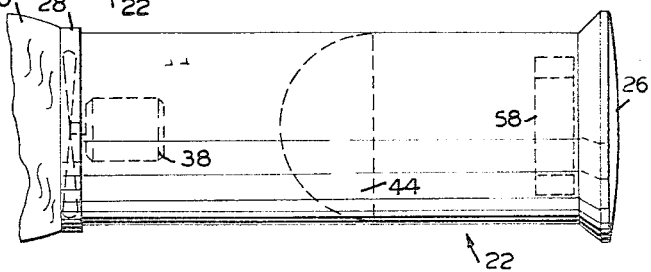

In the configuration of FIGURE 7, the heating means 58 is located within the blower means 22 near the inlet end 26 thereof, the air flow check means 44 is located within the blower means 22 between the heating means 58 and the outlet end 28 of the blower means 22, and the air flow producing means 38 is located within the blower means 22 between the air flow check means 44 and the outlet end 28 of the blower means 22.

Figure 8:
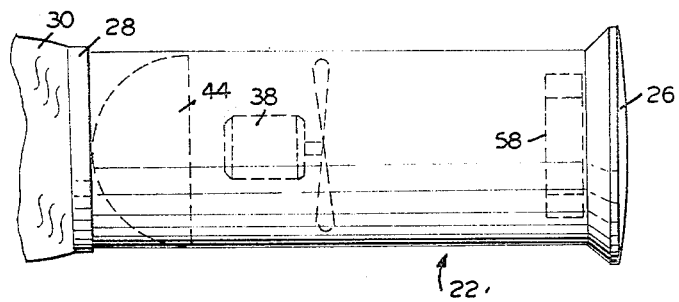

Finally, in FIGURE 8 the heating means 58 is located in the blower means 22 at the inlet end 26 thereof, the air flow producing means 38 is located within the blower means 22 between the heating means 58 and the outlet end 28 of the blower means 22, and the air flow check means 44 is located in the blower means 22 between the air flow producing means 38 and the outlet end 28 of the blower means 22.

As shown in FIGURE 3, only the lower blower means 22 is provided with the air flow check means 44. However, it is also feasible to provide each blower means 22 with an air flow check means 44.

In the operation of the dryer blowing system shown in FIGURE 3, when both air flow producing means 38 are operating, air will flow into the plenum chamber 10 by passing through the outlet ends 28 of both of the blower means 22 and into the plenum chamber 16 through the inlet end 12 thereof. The air flow check means of the lower blower means 22 will be in the open position as illustrated by the one door 46 in FIGURE 3. Then if it is desirable to reduce the volume of air flowing into the plenum chamber 10, the air flow producing means 38 of the lower blower means 22 can be stopped. When the air flow producing means 38 of the lower blower means 22 is stopped (of course the air flow producing means 38 of the upper blower means 22 continues to operate), the air flow check means 44 will close because of the lack of air pressure against the doors 46 and because of the back-pressure created in the plenum chamber when the air flow producing means 38 is stopped. Thus in this condition the springs 50 will return to their "minimum stretch" position and the doors 46 will move to the dotted positions shown as 56 in FIGURE 2. In this closed position, air will be prevented from escaping from the plenum chamber 10 through the outlet end 28 to the inlet end 26 of the blower means 22 because of the closed doors 46 shown in dotted form r 56.

Figure 9:
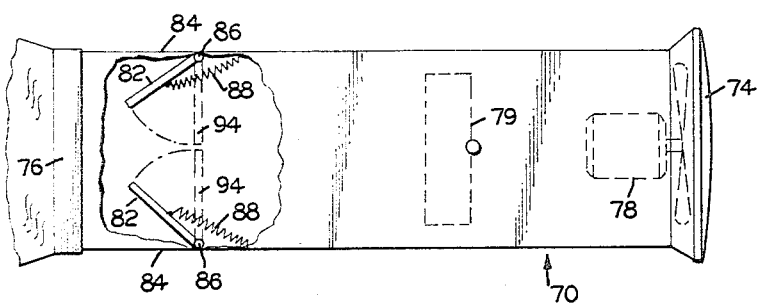
FIGURE 9 is a partially cutaway top view of another alternative embodiment of the blower means shown in FIGURE 2.
Figure 10:
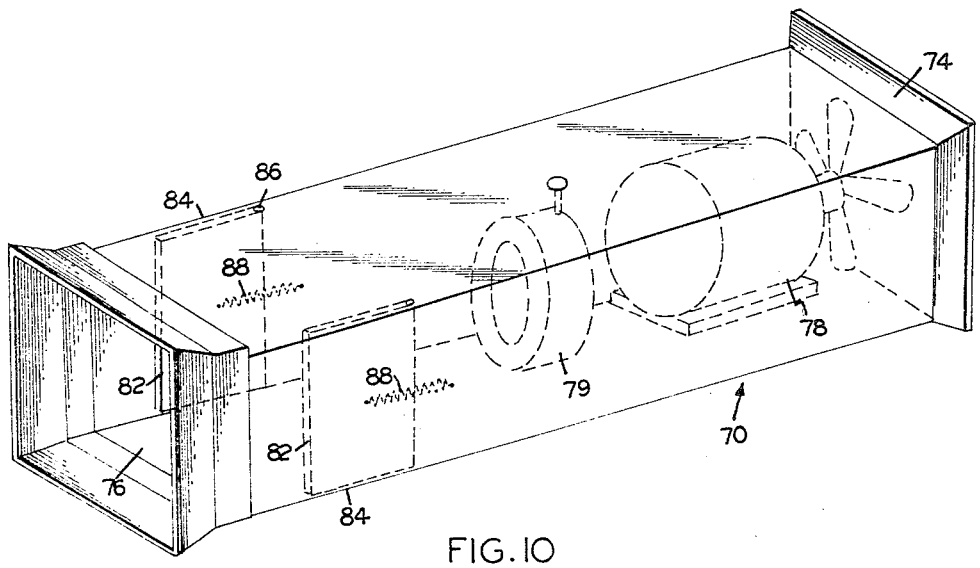
FIGURE 10 is another view of the alternative embodiments shown in FIGURE 9.

FIGURES 9 and 10 show an alternative embodiment of the blower means and the air flow check means. In this alternative embodiment the blower means 70 includes a housing 72 of square or rectangular cross-section, an inlet end 74, an outlet end 76, an air flow producing means 78, a heating means 79 and an air flow check means 80. The air flow check means has doors 82 which rather than being hinged together are fixed along the inner side walls 84 of the housing near the outlet end 76 of the blower means 70 by means of hinged pivots 86. The doors 82 have a flat, rectangular shape and are biased by springs 88 connected at one end to a door 82 and at the other end to the inner side walls 84. In FIGURE 9 the doors 82 are shown in partially open position and shown at 94 in closed position. In FIGURE 10 the doors 82 are shown in completely open position which is the position when air flow producing means 78 is operating.

Various modifications are contemplated and may obviously be resorted to by those skilled in the art without departing from the spirit and scope of the invention, as hereinafter defined by the appended claims, as only preferred embodiments thereof have been disclosed.

What is claimed is:
1. A drying system for green peanuts comprising in combination:
  (a) a plenum chamber,
  (b) an inlet to said plenum chamber for the introduction of air,
  (c) at least two outlets for air located at spaced intervals along the length of said plenum chamber, said outlets being adapted to conduct air to one or more drying bins located outside the plenum chamber,
  (d) the said inlet being connected to a source of air,
  (e) said source of air comprising:
    (1) at least two air blower means,
      (A) each air blower means comprising a housing of generally tubular configuration and each such tubular housing having an inlet end and an outlet end,
      (B) the tubular housings for said air blower means preferably being mounted side-by-side with their axes generally parallel to each other and to the ground,
      (C) the outlet end of each said tubular housing being connected to the inlet of said plenum inlet, and
    (2) an air flow check means mounted within the tubular housings of at least one of said air blower means, whereby said air flow check means prevents the flow of air from the outlet to the inlet end of the tubular sousing in which it is mounted and whereby when only one of said air blower means is activated the air being blown thereby will not exit through the inlet end of the tubular passageway of any other air blower means.

2. A drying system as set forth in claim 1 wherein said air flow check means includes:
  (a) a pair of doors,
  (b) means for supporting said doors and for allowing said doors to pivot, and
  (c) biasing means for allowing said doors to permit the passage of air flow when the associated blower means is in operation and to prevent the passage of air flow when the associated blower means is not in operation.

3. A drying system as set forth in claim 2 wherein each of said blower means also includes a heating means mounted within said blower means.

References Cited
UNITED STATES PATENTS

| | | | |
|---|---|---|---|
| 1,950,942 | 3/1934 | Haas | 34—19 |
| 2,282,373 | 5/1942 | Minkler et al. | 165—122 |
| 2,668,491 | 2/1954 | Gerlitz | 98—43 |
| 2,714,258 | 8/1955 | Smith et al. | 34—233 X |
| 3,036,382 | 5/1962 | Shotton | 34—48 |

ROBERT A. O'LEARY, *Primary Examiner.*

T. W. STREULE, *Assistant Examiner.*